Figure 1:
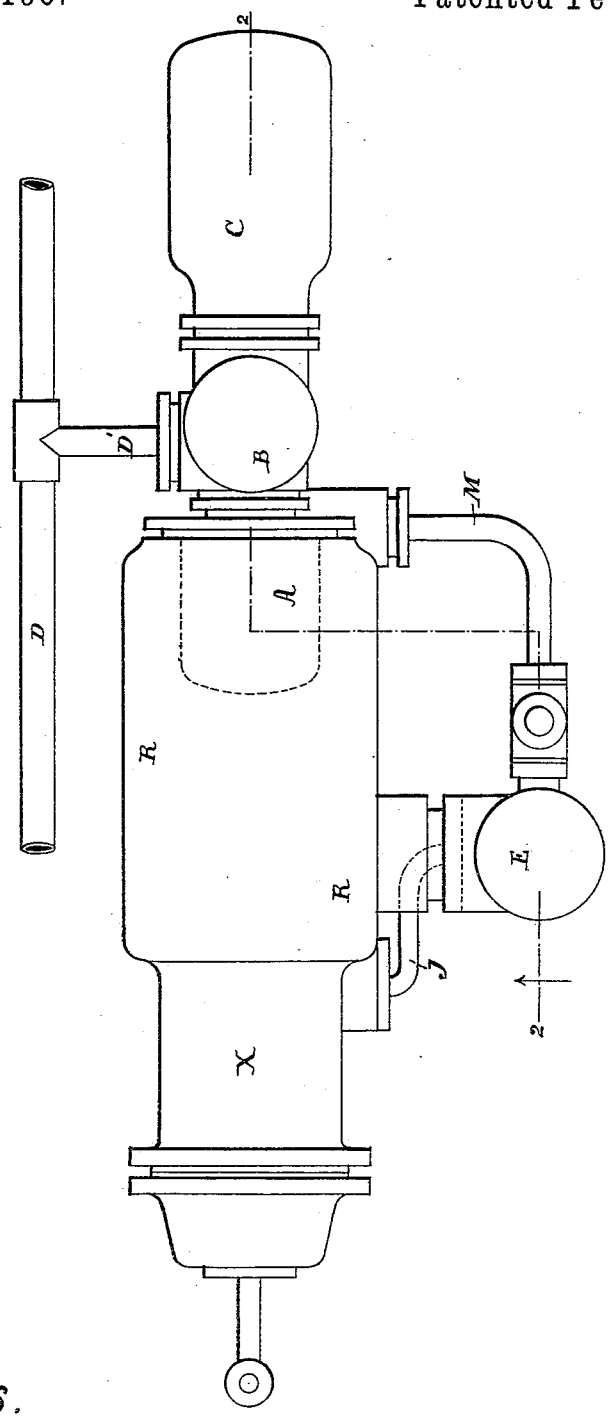

(No Model.) 4 Sheets—Sheet 1.

A. WENGER.
PNEUMATIC BRAKE APPARATUS FOR RAILWAY TRAINS.

No. 555,196. Patented Feb. 25, 1896.

WITNESSES.
John Becker
Fred White

INVENTOR.
Adolphe Wenger,
By his Attorney,
Arthur E. Fraser (No Model.) 4 Sheets—Sheet 2.
A. WENGER.
PNEUMATIC BRAKE APPARATUS FOR RAILWAY TRAINS.
No. 555,196. Patented Feb. 25, 1896.
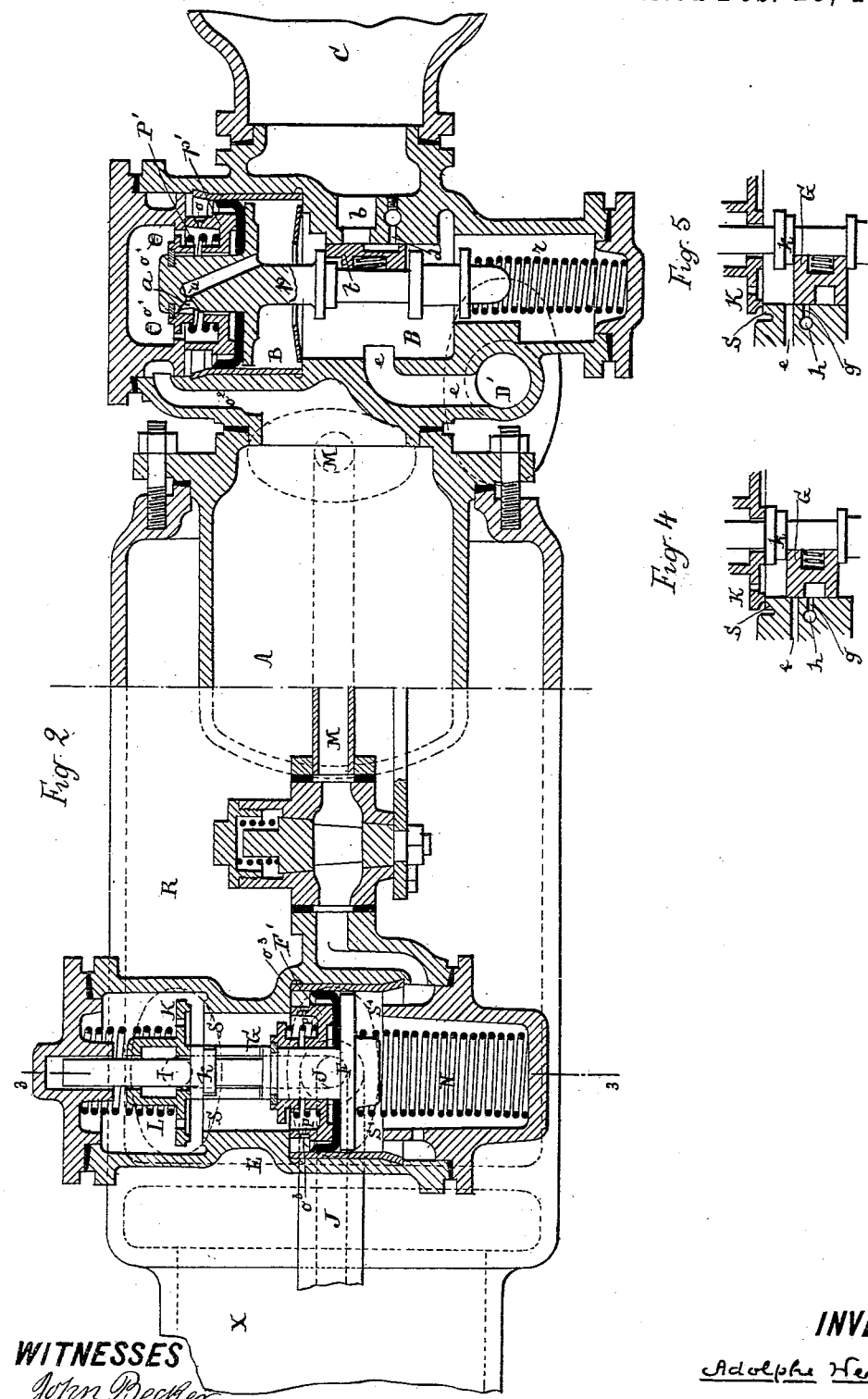
WITNESSES
John Becker
Fred White
INVENTOR.
Adolphe Wenger.
By his Attorneys,
Arthur C. Fraser & Co.

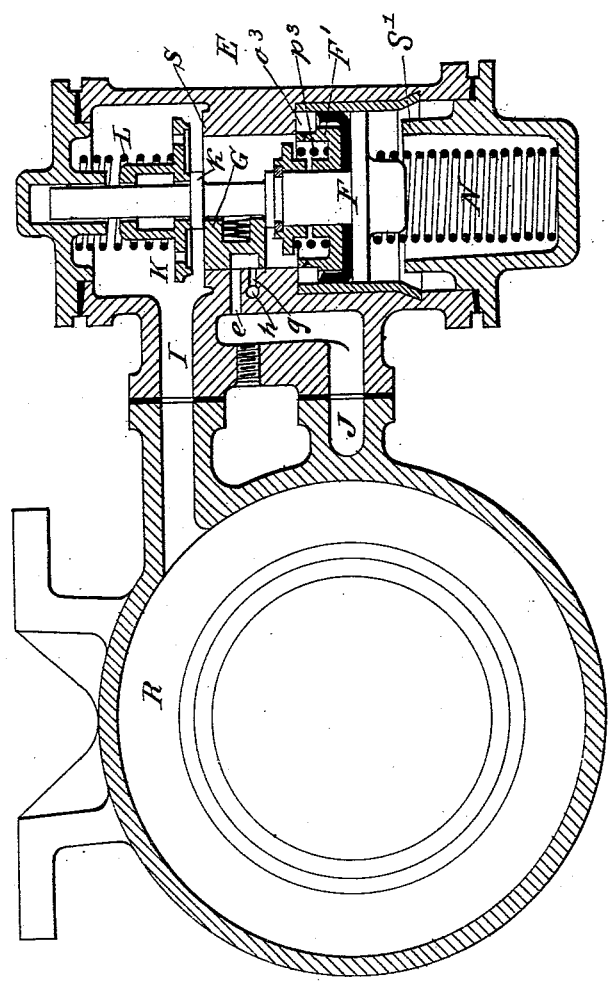

(No Model.)  4 Sheets—Sheet 4.
A. WENGER.
PNEUMATIC BRAKE APPARATUS FOR RAILWAY TRAINS.
No. 555,196.   Patented Feb. 25, 1896.
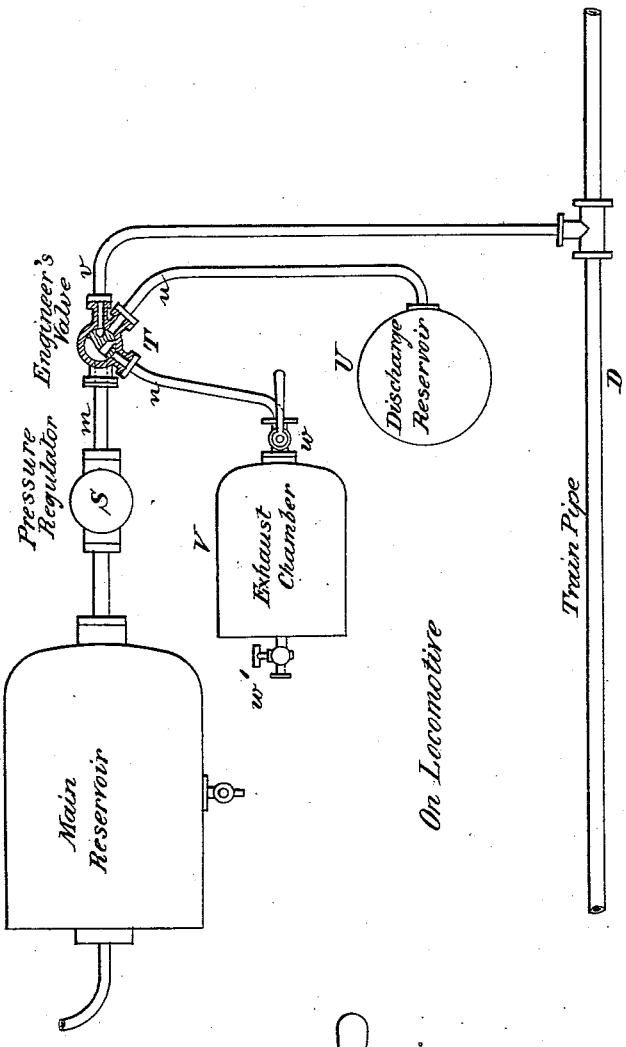
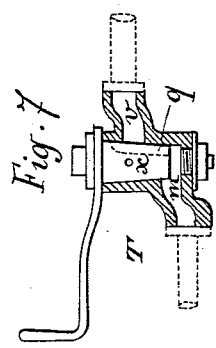
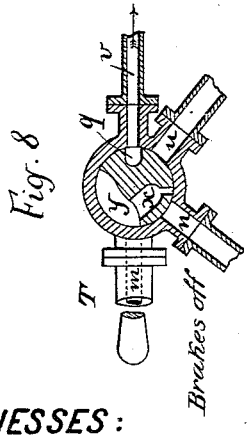
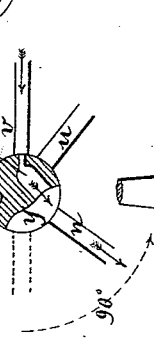
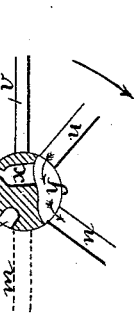
WITNESSES:
John Becker
Fred White
INVENTOR:
Adolphe Wenger,
By his Attorneys:
Arthur E. Fraser &Co.

UNITED STATES PATENT OFFICE.

ADOLPHE WENGER, OF PARIS, FRANCE.

PNEUMATIC BRAKE APPARATUS FOR RAILWAY-TRAINS.

SPECIFICATION forming part of Letters Patent No. 555,196, dated February 25, 1896.

Application filed August 17, 1889. Serial No. 321,085. (No model.) Patented in France February 13, 1888, No. 188,711, and in England June 7, 1889, No. 9,480.

*To all whom it may concern:*

Be it known that I, ADOLPHE WENGER, a citizen of the French Republic, residing in Paris, France, have invented certain new and useful Improvements in Pneumatic Brake Apparatus for Railway-Trains, of which the following is a specification.

This invention is the subject of a patent in France, No. 188,711, dated February 13, 1888, and of a provisional application in England, No. 9,480, dated June 7, 1889.

This invention relates chiefly to means for accelerating the action of pneumatic brakes, to valve arrangements for the distribution of air to the brake-cylinders, and to the construction of the engineer's brake-valve.

For accelerating the action of the brakes I provide an apparatus placed under each carriage or car, which, whenever a slight decrease of pressure occurs in the train-pipe, effects a much greater depression by the partial emptying of the compressed air contained in the train-pipe into a special reservoir, which I call a "receiver."

Figure 1 of the annexed drawings is a plan of the brake apparatus upon the carriage or car. Fig. 2 is a side elevation on a larger scale, partly in vertical section, cut in the planes denoted by the line 2 2 in Fig. 1. Fig. 3 is a transverse section through the auxiliary reservoir and distributer or triple valve, cut on the line 3 3 in Fig. 2. Figs. 4 and 5 are fragmentary views answering to Fig. 3 and showing the parts in different positions. Fig. 6 is a diagrammatic view showing the several apparatus of the locomotive. Fig. 7 is a vertical section, and Fig. 8 a horizontal section, of the engineer's valve. Figs. 9, 10, and 11 are diagrammatic views of this valve, showing it in different positions.

On the locomotive there is provided, as usual, an air-compressor for forcing air into a main reservoir Q, Fig. 6, from which it passes by a pressure-regulator S to the engineer's valve T, which controls the admission of compressed air to and its discharge from the train-pipe D, being connected therewith by a pipe $v$.

On each carriage or car, in addition to the usual brake-cylinder X and auxiliary reservoir R, I provide two air-reservoirs A and C, communicating with each other and with the train-pipe D and the open air through a special valve-box B. The reservoir A, I call the "accelerator-reservoir," and the reservoir C, I call the "receiver." The latter is a closed vessel, the capacity of which bears a certain proportion to that of the train-pipe D of each carriage, according to the extent of reduction of pressure that it is desired to produce. The train-pipe D is in constant communication with the reservoir A, the variations in the pressure of which serve to actuate the brake, this reservoir being normally in communication with the auxiliary reservoir R through the medium of the pipe M and triple valve E.

The "accelerator," properly called, is composed of the valve-box B, in the upper part of which works a piston $p$. A check-valve is provided, which allows air to pass upward, but prevents air from passing down. This check-valve is preferably constructed as a cupped packing on the piston $p$, as shown. This piston is supported by a light spring $r$ in the lower part of the valve-box, and the stem of the piston engages between collars, slide-valve $t$ governing ports $b$ and $d$, the former of which leads into the receiver C and the latter leads to the outer air.

The train-pipe D communicates by a branch D' and port $e$ with the interior of the valve-box B under the piston, so that the compressed air entering from the train-pipe presses up the piston, which carries with it the valve $t$, which puts the ports $d$ and $b$ into communication, as shown in Fig. 2, so that the receiver C is put into communication with the outer air. The compressed air presses back the cupped packing and passes around the piston, flowing through the orifices $o$ and $o'$ and port $o^2$ into the accelerator-reservoir A, and it passes also from this reservoir through the conduit M and triple valve E to the auxiliary reservoir R. This is the normal condition of the apparatus when the brakes are off.

In order to apply the brakes forcibly the pressure in the train-pipe D is reduced sufficiently to cause the excess of pressure above the piston $p$ to press it down against the tension of the spring $r$. The consequent movement of the slide-valve $t$ opens the port $b$ to the interior of the valve-box B, whereupon air flows from the latter and the train-pipe into the receiver C until the pressures in the valve-box and receiver are equalized, thereby effecting a reduction of pressure in the train-pipe proportional to the capacity of this receiver relatively to that of the train-pipe. Upon the reduction of pressure in the train-pipe compressed air from the accelerator-reservoir A escapes by a small hole $a$ through the piston $p$, thereby reducing the pressure in the reservoir A until it is brought nearly to equilibrium with that in the train-pipe, when the piston $p$ is pressed up again by the spring $r$, and the compressed air stored in the receiver C escapes into the atmosphere through the ports $b$ and $d$.

The rapidity with which the pressure in the train-pipe is reduced depends upon the greater or less capacity of the receiver C relatively to that of the train-pipe and its communications, and is alike for the entire train, while the rapidity with which the brake is applied on each carriage depends upon the area of the small hole $a$ through the piston, since this hole determines the rapidity of flow of the compressed air from the accelerator-reservoir A, and the reduction of pressure in this reservoir is what effects the application of the brake. Thus the rapidity of action of the brake on each carriage may be determined by providing a larger or smaller hole $a$.

The accelerator causes the reduction of pressure in the train-pipe to be effected very rapidly; but by employing a hole $a$ of suitably-diminished area the time of application of each brake may be retarded as desired, whereby are secured to any extent desired the following important results—namely, first, instantaneousness in the application of the braking action through the train, and, second, the slow and progressive application of each brake to whatever extent may be desired, as determined by the area of the escape-hole $a$.

In the preceding description I have assumed that the reduction of pressure effected in the train-pipe was sufficiently rapid to accomplish the operation of the movable parts of the accelerator, which is the case in making an emergency stop. In case, however, this reduction of pressure is sufficiently slight and slow so that the piston $p$ is not pressed down, the hole $a$ will serve itself to permit the slow passage of air from the reservoir A into the train-pipe, so that the brakes will be moderately applied. Thus are realized the three conditions which are found to be necessary for the application of continuous brakes on very long trains.

In the communication between the reservoir A and the auxiliary reservoir R is interposed the triple valve E. In the valve-box of this valve is a piston F, which also has a cupped packing, permitting the free passage of the air upward, but preventing its passage downward, and which piston also works a slide-valve, (lettered G,) which is shown best in Fig. 3. The brake-pipe or conduit M from the reservoir A opens into the valve-box E beneath the piston F, and from above the piston a conduit I leads to the reservoir R. The conduit J, Fig. 3, communicates with the brake-cylinder X. The slide-valve G acts when the piston is raised to put into communication a port $e$, leading into the conduit J, and a port $g$, leading to a conduit $h$, which communicates with the outer air.

Let us suppose that air at a pressure of four kilograms, for example, is forced into the train-pipe. This air, after having passed by the accelerator, as has been described, enters through the brake-pipe M under the piston F and lifts this piston to the position shown in Fig. 2, then passes around the piston by pressing back its cupped packing and enters through holes $o^3$ into the chamber which contains the slide-valve G, and from there by the conduit I enters the auxiliary reservoir R, which is thus charged with compressed air, while the brake-cylinder X is entirely emptied by being put into communication with the outer air through the slide-valve G, which occupies the position shown in Fig. 3, whereby any pressure is permitted to escape from the brake-cylinder through the conduit J, ports $e$ and $g$, and conduit $h$. This is the normal condition of the apparatus when the brakes are off, the auxiliary reservoir R being charged with compressed air and the brake-piston being entirely relieved from pressure. When the pressure in the train-pipe is reduced the consequent reduction of pressure in the accelerator-reservoir A causes a reduction in the brake-pipe M, and the piston F and slide-valve G of the triple valve are pressed down by the superior pressure above the piston, which cannot escape by reason of the expansion of the cupped packing. The slide-valve G moves down to the position shown in Fig. 5, so that the compressed air is permitted to pass from the auxiliary reservoir R through the port $e$ into the brake-cylinder X, causing the brakes to be put on. The brakes are applied with a rapidity and force depending on the greater or less capacity of the reservoir C and on the greater or less area of the escape-hole $a$, as already described.

The pistons $p$ and F of the two valve-boxes have cupped-leather packings, with their lips directed upwardly, and which are pressed against the flanges of the pistons by collars acted against by springs, so that while they permit the passage of air upward they prevent the return of the air downward, remaining tight notwithstanding the drying of the leather. The collar of the piston $p$ is lettered $p'$ in Fig. 2 and its spring $P'$. The collar of the piston F is lettered $F'$ and its spring $P^3$.

Over the piston F in the upper chamber of the triple valve E are an abutment-collar K and spring L, while in the lower chamber underneath the piston F is a spring N, which acts against the piston in its entire movement. The spring L, on the contrary, by reason of the abutment-collar K, which comes to rest against a shoulder S S in the valve-box, leaves the piston-rod at the moment that the slide-valve G takes a position in which the port e is entirely closed, as represented in Fig. 4. The piston F, continuing its descending movement under the superior pressure above it, has to compress the spring N without the assistance of the tension of the spring L. Its descent is stopped when it strikes the shoulders S' S', Fig. 2, and in this position the port e is entirely uncovered, as shown in Fig. 5.

In the ascent of the piston from the moment when it leaves the lower part until the collar k on its rod encounters the stop-collar K of the upper spring the piston ascends by reason of the pressure of the spring N. At this moment the port e is closed by the slide-valve and the piston encounters a new resistance due to the spring L. It results from this that if the combined pressures of the compressed air and the spring N below the piston are not sufficient to overcome the combined pressures of the compressed air and spring L above it it comes to rest in this position and the port e remains closed for an indefinite time until by the admission of further compressed air beneath the piston an increased pressure is attained, which, added to the spring N, overcomes the resistance of the spring L. By reason of this construction of the triple valve the pressure in the brake-cylinder may be varied proportionally to the decrease of pressure in the train-pipe—that is to say, the working pressure may be regulated to a nicety and any desired pressure may be maintained in the brake-cylinder as long as may be required. In this position when an increased pressure is sent into the train-pipe superior to the resistance of the upper spring L the latter is pressed in its turn, the piston assumes again the position indicated in Figs. 2 and 3, and the brake is thrown off by reason of the escape of air from the brake-cylinder into the atmosphere through the ports e and g, which are put in communication by the slide-valve.

For charging the train-pipe or varying the pressure therein so as to operate the brakes I provide an engineer's brake valve or cock, which is shown in Figs. 7 to 11. This valve consists of a plug formed with passages through it and rotatable within a casing which has four ports. The port m, which enters the casing beneath the plug, communicates with the supply-pipe leading from the main reservoir. The port n is the escape-port discharging into the outer air either directly or preferably indirectly through an exhaust-chamber V. The port u leads to a discharge-reservoir, and the port v leads to the train-pipe.

When the valve is in the position shown in Fig. 8, the compressed air from the main reservoir enters under the plug of the valve and passes by the groove q to the port v so that the pressure in the train-pipe is maintained for holding off the brakes. The other orifices n and u are closed. If the handle of this valve be turned to ninety degrees from this position, as shown in Fig. 9, the supply of compressed air to the train-pipe is shut off and a small hole x is brought into coincidence with the port v so that the train-pipe is emptied slowly through this hole, which communicates with the cavity y, which cavity at this moment is in communication with the escape-port n. In this position the pressure in the train-pipe is gradually reduced, falling so slowly that the air from the special accelerator-reservoirs A is able to flow out through their small holes a without actuating the accelerator-pistons p, so that the brakes are applied slowly and progressively, the same as if the accelerators were not used. The brakes continue thus to be slowly applied until by turning the valve forty-five degrees to the right or left the flow of air from the train-pipe is shut off, whereupon the brakes remain on with the force they have acquired. If, however, the valve be turned hard around to one hundred and eighty degrees from the first position, as shown in Fig. 10, the train-pipe discharges instantly through the cavity y and port u into a discharge-reservoir U, Fig. 6, the capacity of which is so calculated that the discharge into it will sufficiently reduce the pressure in the train-pipe to give movement to the pistons p p of the several accelerators. The latter immediately act and the brakes are applied suddenly and forcibly.

On turning back the valve about forty-five degrees the cavity y brings the ports n and u into communication, as shown in Fig. 11, and the air escapes from the discharge-reservoir, so that the apparatus is made ready to act again. When the valve is restored to its initial position the compressed air re-enters the train-pipe through the ports m, q and v, restoring the pressure therein and thereby taking off the brakes.

Instead of discharging the air from the train-pipe directly into the atmosphere, I prefer to cause it to pass by a reduced orifice into a reservoir or exhaust-chamber V, Fig. 6, communicating with the atmosphere through another reduced orifice that may be closed when it is desired to arrest the outflow. The object of this reservoir is to equalize the braking effect on the cars throughout the train. It is well understood that in braking a long train the escaping of the pressure at the locomotive directly into the open air reduces the pressure more rapidly, and hence effects a greater reduction of pressure toward the front of the train than at the rear thereof, so that the brakes are applied first and most forcibly to the forward cars. Starting, for example, with a pressure of four kilos throughout the train-pipe, the reduction of the pressure at the forward end of the train to, say, one kilo would in a given time reduce the pressure at the rear end to, for example, three kilos, and throughout the intermediate portions of the train-pipe the pressures would vary proportionately in a manner which might be represented graphically by an inclined line. If at this instant the escape were cut off at the engineer's valve, the pressure in the train-pipe would quickly be equalized at the average pressure of, say, two kilos, and in a manner which would be represented graphically by a vibratory movement of such an inclined line to the horizontal. During this equalizing movement the pressure toward the rear of the train would continue to be reduced, falling, say, from three to two kilos, and consequently the brakes at the rear of the train would be applied with increasing force, while toward the front of the train the pressure in the pipe has increased, say, from one to two kilos, thereby partially relieving the brakes toward the front of the train. By the use of the exhaust-chamber V my invention overcomes this irregular action.

Instead of escaping the air from a pipe directly into the atmosphere, it is admitted through a reduced orifice into the chamber V, while simultaneously the outlet-orifice from this chamber (designated in Fig. 6 by the valve $w'$) is opened to provide a contracted outlet. The cubical capacity of the exhaust-chamber V is so proportioned to that of the train-pipe that when part of the compressed air from the train-pipe is admitted into the chamber and the pressure in the train-pipe has equalized itself it will not rise above that prevailing toward the front of the train, and consequently will not relax the brakes at the forward cars. This result is due to the confining of a portion of the air in the exhaust-chamber and thereby preventing a too rapid reduction of the pressure in the forward part of the train-pipe, so that the subsequent partial restoration of the pressure by its equalization throughout the train-pipe is avoided. The reduced orifice controlling the admission of air to the exhaust-chamber may be one of the ports of the engineer's valve, this being the arrangement shown, although it might be any suitable valve operated in any convenient manner—as, for example, a cock, which is shown at $w$. The outlet valve or cock $w'$ is designed to be operated simultaneously with the inlet-valve, and should consequently be connected therewith. In practice it is preferable to connect both the inlet and outlet to the engineer's valve.

My invention may be modified in many ways without departing from its essential features—as, for example, by the substitution of known mechanical expedients or equivalents for the special devices shown. For instance, the slide-valves $t$ and G may be substituted by any other known form of valve provided they be connected to and derive motion from the pistons $p$ and F, respectively, to the same end so far as the opening and closing of the respective ports is concerned, as in the construction shown. The pistons $p$ and F may also be substituted by known equivalents of pistons. The details of construction may be varied to a great extent, as will be well understood by mechanical engineers. The cup-leather packings in the pistons $p$ and F serve the double purpose of packings and of check-valves opening upwardly and might be substituted for the latter purpose by any other construction of check-valves. The leakage hole or passage $a$ through the piston $p$ is essentially merely a duct or port affording communication between the reservoir A and the train-pipe and has no necessary connection with the accelerator or its piston $p$, being formed through the piston $p$ merely for convenience.

I claim as my invention the following-defined novel features and combinations, substantially as hereinbefore specified, namely:

1. In a system of air-brakes operating to apply the brakes on the reduction of pressure of the compressed air in the train-pipe, the combination with the train-pipe, the brake-cylinder, the auxiliary reservoir, and the triple valve for controlling the passage of air to and from the brake-cylinder, of a restricted duct in the passage through which the triple-valve chamber communicates with the train-pipe, and an accelerator in the passage between the triple valve and train-pipe, constructed with a spring-pressed piston-resisting movement due to a reduction of pressure in the train-pipe, whereby the brakes may be applied gently by the reduction of pressure by the leakage of air from the triple valve through said restricted duct, an escape-port in communication with the train-pipe and a valve normally closing said port, the said valve connected to said piston to be moved to uncover said port when the reduction of train-pipe pressure becomes sufficient to move said piston, whereby thereupon air is discharged from the train-pipe to quickly reduce its pressure, so that by the accelerated escape of air from the triple valve the brakes are applied forcibly for an emergency stop.

2. In a system of air-brakes operating to apply the brakes on the reduction of pressure of the compressed air in the train-pipe, the combination with the train-pipe, the brake-cylinder, the auxiliary reservoir, and the triple valve for controlling the passage of air to and from the brake-cylinder, of an accelerator-reservoir communicating with the passage between the triple valve and train-pipe, said reservoir communicating with the train-pipe through a restricted duct, and an accelerator in the passage between said reservoir and the train-pipe, constructed with a spring-pressed piston of sufficient tension to be unaffected by a slight reduction of pressure in the train-pipe, whereby the brakes may be applied gently by the reduction of pressure by its leakage through said restricted duct, and with a valve normally closing an escape-port, connected to said piston to be moved thereby when the latter is displaced by a certain greater reduction of train-pipe pressure, and thereby to open an escape for the pressure from the train-pipe, and quickly reduce its pressure, so that by the accelerated escape of air from the accelerator-reservoir and the corresponding reduction of pressure on the train-pipe side of the triple valve the brakes are applied forcibly for an emergency stop.

3. In an air-brake system the combination with the brake-cylinder, auxiliary reservoir, and triple valve, of an accelerator-reservoir communicating with the passage between the triple valve and the train-pipe, and a restricted duct or passage affording communication between the accelerator-reservoir and the train-pipe, whereby upon the reduction of pressure in the train-pipe the lesser reduction in the accelerator-reservoir by leakage through said duct effects the action of the triple valve to apply the brakes, and the brakes are applied with a rapidity on each car directly proportional to the area of said duct.

4. In an air-brake apparatus, the combination with the brake-cylinder, auxiliary reservoir and triple valve and a restricted duct through which the triple-valve chamber communicates with the train-pipe, of an accelerator between the triple valve and the train-pipe consisting of a valve-box, a piston movable therein constructed with a check-valve adapted to permit the passage of air from the train-pipe to the triple valve and auxiliary reservoir and to prevent its passage back except through said duct, a spring pressing against said piston in the same direction as the pressure in the train-pipe, a valve moved by said piston, and an escape-port arranged to be uncovered by said valve when moved by the piston in the direction opposed to the pressure of the spring, whereby a decrease of pressure in the train-pipe operates said valve to let some air escape and thereby to further decrease its pressure, without permitting a corresponding escape of the pressure stored beyond the valve, and on the increase of the train-pipe pressure air passes the valve-piston to restore the pressure beyond it.

5. In an air-brake apparatus, the combination with a brake-cylinder, reservoir and triple valve, of a receiver, an accelerator distinct from the triple valve consisting of a valve-box, a piston movable therein, an escape-port opening from the interior of the valve-box to said receiver, a port opening from said valve-box to the outer air and a valve movable over said ports and connected to and moved by said piston and arranged relatively to said ports so that in the normal position of the piston it establishes communication between said ports thereby affording communication between the receiver and the open air, a spring pressing against said piston to resist its movement due to a reduction of train-pipe pressure, whereby a slight reduction of pressure does not move said piston, but upon a reduction sufficient to move the piston against the pressure of the spring the valve is displaced and uncovers said escape-port and thereby opens communication between the interior of the valve-box and the receiver to permit air to escape from the valve-box and train-pipe into the receiver and effect a further reduction of train-pipe pressure.

6. In an air-brake apparatus, the combination with the train-pipe, brake-cylinder and triple valve, of a reservoir of compressed air on the car in communication with the triple valve, a restricted duct or passage affording communication between said reservoir and the train-pipe, and an accelerator consisting of a valve-box with a piston movable therein, said box communicating on one side of the piston with said reservoir and on the other with the train-pipe, and having in the latter side an escape-port, and a valve connected to said piston and arranged relatively thereto to cover said port in the normal position of the piston, and the piston movable sufficiently from its normal position to displace said valve to uncover said escape-port, whereby a gradual reduction of pressure in the train-pipe is followed by a gradual outflow of air from the reservoir through said restricted duct without affecting the accelerator-valve, and a sudden reduction of pressure in the train-pipe operates the piston of said accelerator and uncovers said escape-opening, so that air escapes through it from the train-pipe, and effects a further reduction of pressure in the latter for an emergency stop.

7. In an air-brake apparatus, a triple valve consisting of a valve-box having a brake-cylinder port and a discharge-port, a piston movable in said box, the valve-box connected on one side of the piston to the auxiliary reservoir and on the other side thereof to the train-pipe, a valve moved by said piston and constructed relatively to said ports to connect them when in the normal extreme position, to uncover the brake-cylinder port when in the opposite extreme position, and to close both ports when in an intermediate position, a spring L reinforcing the pressure from said reservoir and tending to press the valve from the normal to said intermediate position, and a stop for arresting its action in the latter position, whereby an increase of pressure on the train-pipe side of said piston sufficient to overcome said spring is necessary to throw off the brakes.

8. In an air-brake apparatus, a triple valve consisting of a valve-box having a brake-cylinder port and a discharge-port, a piston movable in said box, the valve-box connected on one side of the piston to the auxiliary reservoir and on the other side thereof to the train-pipe, a valve moved by said piston and constructed relatively to said ports to connect them when in the normal extreme position, to uncover the brake-cylinder port when in the opposite extreme position, and to close both ports when in an intermediate position, two springs pressing in opposite directions against said valve, the stronger arranged to exert its tension in the same direction as the pressure in the train-pipe, and the weaker arranged to exert its tension in the same direction as the pressure in the auxiliary reservoir, and a stop for arresting the action of the weaker spring when the valve is in the intermediate position, whereby normally the valve is held to the exhaust position by the combined pressure in the train-pipe and the tension of the stronger spring, and upon a certain reduction of the train-pipe pressure the pressure from the auxiliary reservoir presses the valve to the open position, and upon a certain increase of pressure in the train-pipe the valve is pressed to the intermediate or closed position, arresting the braking and holding the brake set, and a further increase of pressure sufficient to overcome the tension of the weaker spring is required to move the valve to the exhaust position to throw off the brakes.

9. The combination to form a triple valve of a valve-box having brake-cylinder port $e$ and exhaust-port $g$, of valve G, piston F connected to it, having shoulder $k$, a spring N on the train-pipe side, pressing the piston and valve toward the exhaust position, a weaker spring L on the auxiliary-reservoir side pressing the piston toward the open position, an interposed movable stop K receiving the tension of said spring L and transmitting it to said shoulder $k$, and a fixed stop S for arresting said stop K and discontinuing the action of the spring on the piston F when the valve reaches an intermediate position closing the port $e$, to the effect described.

10. In an air-brake apparatus, the combination with the train-pipe, brake-cylinder, auxiliary reservoir and triple valve, of a restricted duct constituting the sole passage for discharge of air from the piston-chamber of the triple valve to the train-pipe, whereby the speed of application of the brakes on each car is retarded in inverse proportion to the area of such duct, and a passage of larger area closed by a check-valve adapted to admit air to flow from the train-pipe to the auxiliary reservoir.

11. In an air-brake apparatus, an engineer's valve consisting of a shell having an inlet-port for compressed-air, a train-pipe port, a discharge-reservoir port, and an escape-port, with a plug movable therein having ports which in one position afford communication between the compressed-air inlet-port and the train-pipe port, in another position afford communication between the train-pipe port and the discharge-reservoir port, and in a third position afford communication between the discharge-reservoir port and the escape-port.

12. In an air-brake apparatus, the combination with a source of compressed air, the train-pipe, and an operating-valve, of a chamber or reservoir connected to receive the air discharged from the train-pipe, and provided with means for exhausting its contents to the atmosphere.

13. In an air-brake apparatus, the combination with the source of compressed air, the train-pipe and the engineer's valve, the latter having train-pipe and escape ports, of an exhaust-chamber communicating with the escape-port of the engineer's valve to receive the air discharged from the train-pipe in applying the brakes, and provided with an outlet-port of reduced area communicating with the atmosphere.

In witness whereof I have hereunto signed my name in the presence of two subscribing witnesses.

ADOLPHE WENGER.

Witnesses:
R. D. PRESTON,
MICHEL COQUART.